United States Patent [19]

Nelson et al.

[11] Patent Number: 4,921,402
[45] Date of Patent: May 1, 1990

[54] BALLOON INFLATOR VALVE

[75] Inventors: David C. Nelson, 1585 S. Cleveland-Massillon Rd., Copley, Ohio 44321; William E. Bartasevich, Kent; Robert L. Waldo, Hiram, both of Ohio

[73] Assignee: David C. Nelson, Copley, Ohio

[21] Appl. No.: 345,458

[22] Filed: May 1, 1989

[51] Int. Cl.$^5$ .......................................... F04D 15/00
[52] U.S. Cl. ........................ 415/148; 137/625.48; 137/872; 137/874; 137/881; 141/277; 222/3; 222/514
[58] Field of Search ............... 415/148, 177; 222/3, 222/486, 514; 141/275, 277, 250; 446/220; 137/881, 872, 874, 625.48

[56] References Cited

U.S. PATENT DOCUMENTS

| | | | |
|---|---|---|---|
| 1,109,133 | 9/1914 | Melchers | 415/199.1 |
| 2,089,601 | 8/1937 | Faber | 415/211.2 |
| 2,232,906 | 2/1941 | Ernolf | 415/148 |
| 2,295,366 | 9/1942 | Stout | 137/872 |
| 2,991,589 | 7/1961 | Ayala | 446/220 |
| 3,068,901 | 12/1962 | Anderson | 137/872 |
| 3,090,156 | 5/1963 | Scoparino | 446/220 |
| 4,634,395 | 1/1987 | Burchett | 446/220 |

Primary Examiner—Robert E. Garrett
Assistant Examiner—John T. Kwon
Attorney, Agent, or Firm—Renner, Kenner, Greive, Bobak, Taylor & Weber

[57] ABSTRACT

A valving mechanism for a balloon inflator is presented. The valving mechanism is attached to an inflator comprising a fan driven by a through-flow motor. A piston, received within a cylinder, has two bores passing therethrough, the first bore communicating with atmosphere, and the second bore communicating with a nozzle adapted for receipt of a balloon neck. When the balloon is placed on the nozzle and the piston is urged against a spring, an airstream passes through the second bore to inflate the balloon. When the balloon is removed, a spring urges the piston to a position in which the airstream passes through the first bore to atmosphere reducing the load on the motor and allowing the motor to run cooler.

8 Claims, 2 Drawing Sheets

BALLOON INFLATOR VALVE

TECHNICAL FIELD

The invention herein resides in the art of inflation devices and, more particularly, to apparatus for inflating balloons. Specifically, the invention presents a valving mechanism for balloon inflators for reducing the work duty cycle to prolong inflator life and reduce the temperature of air emitted therefrom.

BACKGROUND ART

Various types of balloon inflators have previously been known. Typically, such inflators incorporate a through-flow motor which draws air from the surrounding atmosphere and exhausts it through an air duct adapted to receive the neck of a balloon. Accordingly, the air used for inflating the balloon is the same air that was drawn through the motor to cool it. As the motor works, its temperature rises. This is aggravated by the use of narrow nozzles at the outlet of the inflator to receive the balloon neck. The narrow nozzle restricts the air flow, adds to the motor load, and accordingly raises the motor temperature. This is particularly true when a high volume of balloons are being inflated in succession, for each balloon constitutes a motor load which varies as the balloon inflates. As a result, the motors of such inflators are given to quick wear-out.

Aggravating this problem further, as the temperature of the motor rises, the balloons are inflated with increasingly warmer air. After the balloon is inflated and the neck sealed, the balloon appears to deflate as the warm air cools and contracts. In the case of Mylar balloons, the balloons become wrinkled and soft-looking in appearance. Further, with Mylar balloons, when the balloon has hit its maximum expansion, the air flow substantially terminates and the load on the motor quickly rises. When the balloon is removed, the small orifice nozzle used for inflating the balloon does not allow the airflow to increase significantly to lower the temperature, but actually presents a continuing load to the motor.

There is a need in the art for an inflator for passing air through a narrow nozzle to the balloons during the inflating process, and subsequently passing the air through a larger opening or orifice, bypassing the nozzle, to increase throughflow of the motor and lower temperature after the inflating process.

DISCLOSURE OF INVENTION

In light of the foregoing, it is a first aspect of the invention to provide a balloon inflator which is adapted for continuous operation, providing air to a balloon through a restricted exhaust nozzle during the inflating process and through a substantially restricted exhaust port when not inflating.

Another aspect of the invention is the provision of a balloon inflator which includes a valve to switch between an inflation mode and a motor cooling mode of operation.

A further aspect of the invention is the provision of an inflator which includes a valve passing air in a first direction for inflating a balloon and in a second direction when no balloon is present.

The foregoing and other aspects of the invention which will become apparent as the detailed description proceeds, are achieved by a balloon inflator, comprising: a fan and motor assembly for generating an air flow stream; and valve means interposed within said airflow stream for directing said airflow stream in a first direction to a balloon nozzle when actuated to a first position, and in a second direction to exhaust the air flow stream to atmosphere when actuated to a second position.

Other aspects of the invention are obtained by a balloon inflator, comprising: a conduit receiving an air stream from a motor and fan assembly; a cylinder interconnected with said conduit and having a first bore therein; and a piston, reciprocatingly received within said cylinder, said piston having second and third bores therein in selective communication with said first bore.

BRIEF DESCRIPTION OF DRAWING

For a complete understanding of the objects, techniques and structure of this invention, reference should be made to following detailed description and accompanying drawing wherein.

BEST MODE FOR CARRYING OUT THE INVENTION

Figure 1:
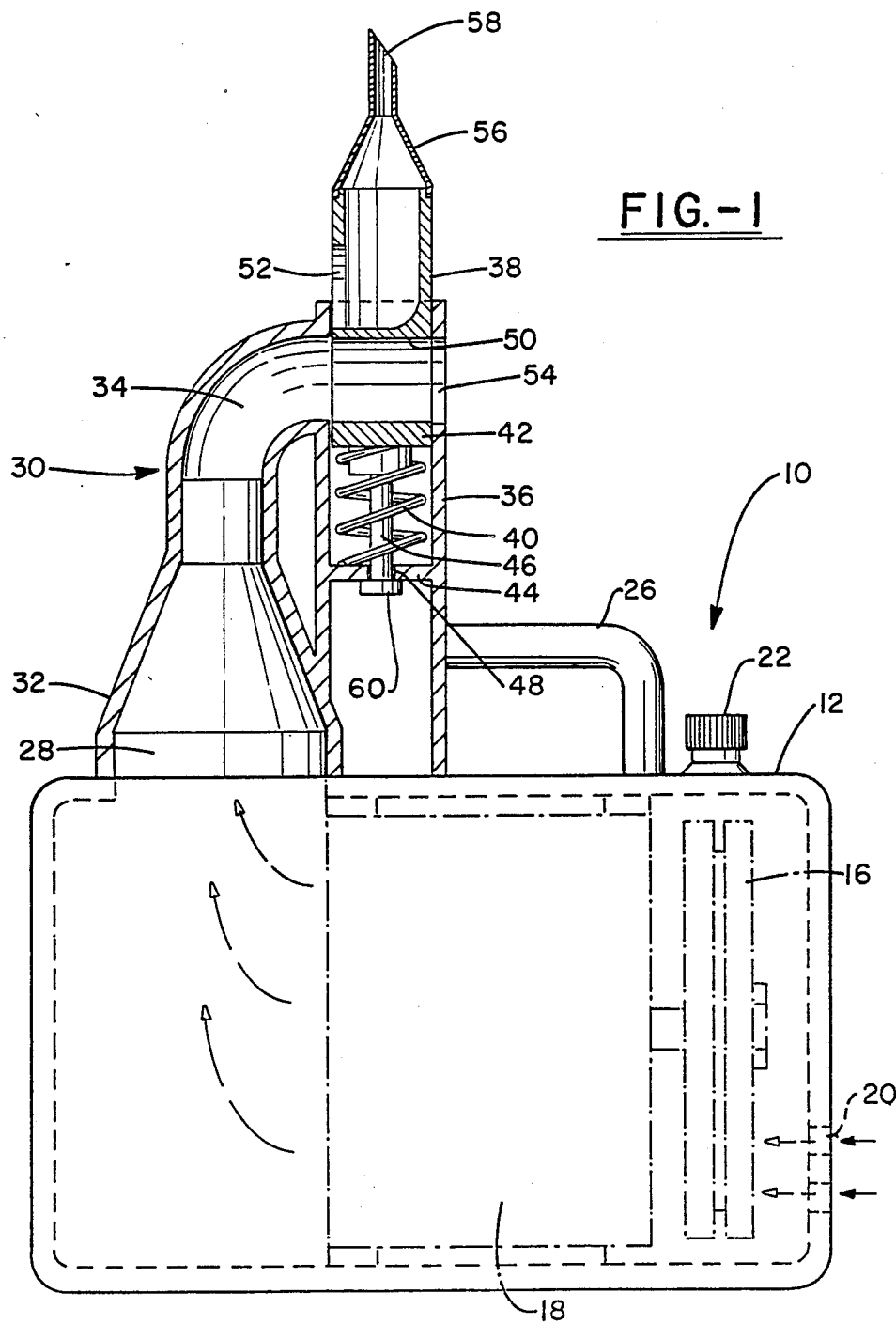
FIG. 1 is an elevational view, in partial cross-section, of a balloon inflator incorporating the valve of the invention.

Referring now to the drawing, and more particularly FIG. 1, and inflator according to the invention is designated generally by the numeral 10. As shown, the inflator 10 includes a housing 12 which receives therein a fan/motor housing 14. Received within the housing 14 is a fan assembly 16, mounted on a shaft driven by a motor 18. In a preferred embodiment of the invention, and as is well known in the art, the motor 18 is a through-flow motor, in which the air drawn by the fan 16 passes through the motor 18 to cool the same.

Figure 2:
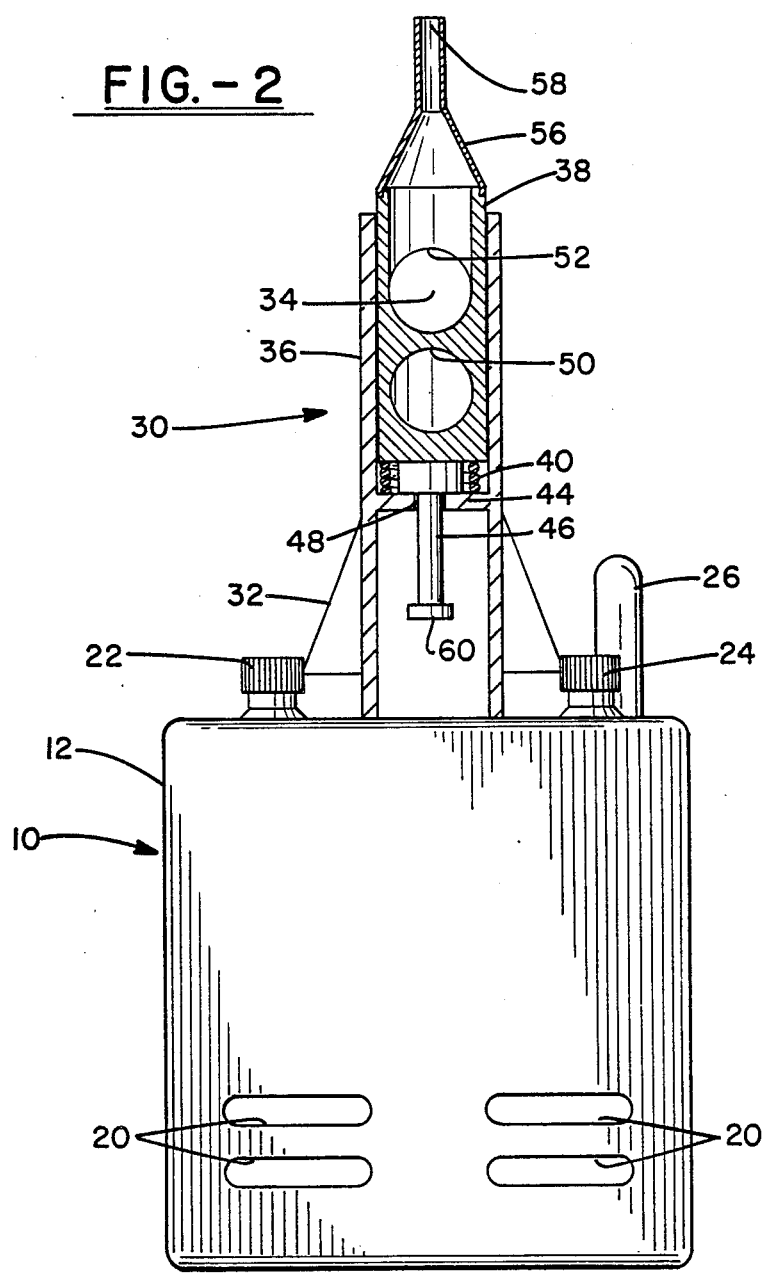
FIG. 2 is an end view of the inflator of FIG. 1

As shown in FIG. 2, a plurality of inlet vents 20 are provided in the housing 12 and in communication with the fan assembly 16. An on/off switch 22 is provided for actuating the motor 18, while a momentary switch 24 is also provided in the event the user might desire to simply allow the motor 18 to run while the switch 24 is depressed, release of the switch 24 terminating operation for obvious purposes. Also provided on the housing 12 is a carrying handle 26.

As shown in FIG. 1, when the motor 18 is actuated, air is drawn through the inlet vents 20 into the interior of the housing 12. This air, shown by the arrows in FIG. 1, passes through the fan assembly 16, and then through the motor 18, serving the purpose of cooling the motor. The air is then exhausted at the end of the motor 18 opposite that of the fan 16 as shown again by the arrows. This air stream then passes through an exhaust collar 28 which is formed as a part of the housing 12. In the prior art, a simple tapered nozzle was attached to the collar 28, the same being adapted for receiving the necks of balloons to be inflated. According to the instant invention, however, the valve assembly 30 is placed over the collar 28, such valve assembly having the structure and function presented below.

As shown, the assembly 30 includes an inlet cone 32 received on the collar 28. The cone 32 passes to a conduit 34 which is substantially circular in cross section and arcuate in nature, bending from a vertical posture to a horizontal posture to intersect with a cylinder 36. The opening of conduit 34 communicates with, and is received by, a similar opening in the side wall of the cylinder 36.

A piston 38 is slidingly received within the cylinder 36 and is biased by a compressive spring 40 interposed between the bottom 42 of the piston 38 and a bottom wall 44 of the cylinder 36. The normal biasing of the piston 38 by the spring 40 is the position shown in FIG. 1. A guide pin 46 extends from the bottom 42 of the piston 38, through the spring 40 and through a hole 48 in the cylinder bottom 44. A cap 60 is connected to the end of the pin 46 for engagement with the bottom 44, restricting movement of the piston 38 against the urging of the spring 40. Accordingly, the normal biased position of the piston 38 is shown in FIG. 1, resulting from the urging of the spring 40 and the restriction of the cap 60.

The piston 38 includes a bore 50 which diametrically traverses across the piston 38. A second bore 52 is provided in the piston 38 above the bore 50. The bore 52 is formed in a side wall of the cylinder 38 and then curves to axially extend upward to communicate with a taped nozzle 56 and opening 58 at the end thereof. An opening 54 in the side wall of the cylinder 36 is positioned opposite the conduit 34 at its intersection with the cylinder 36, to provide a bore through the cylinder. The spacing of the bores 50, 52 is equal to the length of travel of the piston 38 within the cylinder 36, as restricted by the length of the pin 46 having the cap 60 at the end thereof.

It can be readily seen that when the piston 38 is in the biased position within the cylinder 36 as shown in FIG. 1, air from the motor 18 passes through the cone 32, conduit 34, bore 50 and exhausts out the opening 54. With the cross sectional areas of the conduit 34 approximating the total cross sectional area of the inlet vents 20, the air stream flowing through the housing 12 and motor 18 is substantially unimpeded.

In contradistinction to the operation in the posture of FIG. 1, when the piston 38 is depressed against the spring 40 to seat on the bottom 44, the conduit 34 communicates with the bore 52, directing the air stream upwardly through the tapered nozzle 56 and out the opening 58.

In use, an operator may simple actuate the on/off button 22, causing the fan and motor assembly 14 to operate continuously. He may then place the neck of a balloon over the tapered nozzle 56, while at the same time depressing the piston 38 in the cylinder 36 to the position shown in FIG. 2. The air drawn through the vents 20 is then exhausted into the balloon to inflate the same. At the end of the inflation cycle, the balloon is removed and the spring 40 automatically urges the piston 38 to the position shown in FIG. 1, allowing the air stream to exhaust through the conduit 34 and the larger bore 50. This substantially unimpeded flow path reduces the load on the motor 18 and increases the flow of air there through, allowing the motor to run cooler, eliminating the previous problems of introducing the heated air into the balloon, while reducing motor wear. It will be appreciated that the work load or work duty cycle is thus altered to accommodate efficient motor cooling. When a balloon is not present on the tapered nozzle 56, the motor load is substantially reduced, allowing the motor to cool with the resultant increase in air flow.

Thus it can be seen that the objects of the invention have been satisfied by the structure presented above. While in accordance with the patent statutes only the best mode and preferred embodiment of the invention has been presented and described in detail, it is to be understood that the invention is not limited thereto or thereby, accordingly, for an appreciation of the true scope and breath of the invention reference should be had to the following claims.

What is claimed is:

1. A balloon inflator, comprising:
   a fan and motor assembly for generating an airflow stream; and
   valve means interposed within said airflow stream for directing said airflow stream in a first direction to a balloon nozzle when actuated to a first position, and in a second direction to exhaust the airflow stream to atmosphere when actuated to a second position.

2. The balloon inflator according to claim 1, wherein said valve means comprises a spring-biased piston within a cylinder.

3. The balloon inflator according to claim 2, wherein said piston has a first bore passing diametrically therethrough.

4. The balloon inflator according to claim 3, wherein said piston has a second bore entering a side of said piston and thence extending axially to a first end thereof.

5. The balloon inflator according to claim 4, wherein said first end of said piston maintains said balloon nozzle, said balloon nozzle tapering to a tip for receipt by a balloon neck.

6. The balloon inflator according to claim 4, wherein a spring interposed between said piston and cylinder biases said piston to direct said stream of air in said second direction.

7. The balloon inflator according to claim 6, wherein said piston is adapted for reciprocating movement within said cylinder, the movement of said piston being restricted to the spacing between said first and second bores.

8. The balloon inflator according to claim 7, wherein said valve means further comprises a conduit in intersecting communication with said cylinder at the third bore, said third bore of said cylinder being in selective registration with said first and second bores of said piston.

* * * * *